(12) United States Patent
Feetenby et al.

(10) Patent No.: US 6,273,522 B1
(45) Date of Patent: Aug. 14, 2001

(54) TRAILER BRAKE CONTROL

(75) Inventors: Paul Feetenby, Milton; Dennis John McCann, Crickhowell; David Charles Hurst, West Midlands, all of (GB)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/367,661

(22) PCT Filed: Feb. 12, 1998

(86) PCT No.: PCT/GB98/00439

§ 371 Date: Nov. 17, 1999

§ 102(e) Date: Nov. 17, 1999

(87) PCT Pub. No.: WO98/36955

PCT Pub. Date: Aug. 27, 1998

(30) Foreign Application Priority Data

Feb. 18, 1997 (GB) .................................................. 9703356

(51) Int. Cl.$^7$ ................................ B60T 13/66; B60T 8/00
(52) U.S. Cl. .................... 303/7; 188/3 H; 188/112 R; 303/15; 303/22.1; 303/9.69; 303/20
(58) Field of Search .................................. 303/7, 123, 3, 303/20, 15, 155, 122.15, 177, 9.69, 22.1, 22.8; 188/112 ALL, 3 R, 3 H, 195, 198; 280/432

(56) References Cited

U.S. PATENT DOCUMENTS

| | | | |
|---|---|---|---|
| 4,712,839 | * | 12/1987 | Brearley et al. . |
| 5,002,343 | * | 3/1991 | Brearley et al. ........................ 303/7 |
| 5,050,938 | * | 9/1991 | Brearley et al. ........................ 303/7 |
| 5,080,445 | * | 1/1992 | Brearley et al. ....................... 303/15 |
| 5,273,347 | * | 12/1993 | Hansson ................................. 303/7 |
| 5,281,006 | * | 1/1994 | Gotz et al. .............................. 303/7 |
| 5,295,736 | * | 3/1994 | Brearley ................................. 303/7 |
| 5,333,940 | * | 8/1994 | Topfer .................................... 303/7 |
| 5,409,301 | * | 4/1995 | Topfer et al. ........................ 303/22.1 |
| 5,415,466 | * | 5/1995 | Breen et al. ............................ 303/7 |
| 5,427,440 | * | 6/1995 | Ward et al. ............................. 303/7 |
| 5,482,359 | * | 1/1996 | Breen ................................ 303/9.69 |
| 5,496,098 | * | 3/1996 | Brearley . |
| 6,079,791 | * | 6/2000 | Stumpe et al. .......................... 303/7 |
| 6,099,085 | * | 8/2000 | Eckert .................................... 303/7 |
| 6,139,118 | * | 10/2000 | Hurst et al. ............................. 303/7 |

FOREIGN PATENT DOCUMENTS

| | | | |
|---|---|---|---|
| 4446358 | * | 12/1995 | (DE) . |
| 4438252 | * | 5/1996 | (DE) . |
| 19519768 | * | 12/1996 | (DE) . |
| 0303827 | * | 2/1989 | (EP) . |
| 0370671 | * | 5/1990 | (EP) . |
| 0385648 | * | 9/1990 | (EP) . |
| 0485738 | * | 5/1992 | (EP) . |
| 0531077 | * | 3/1993 | (EP) . |
| 9002675 | * | 3/1990 | (WO) . |
| 9719843 | * | 6/1997 | (WO) . |

* cited by examiner

Primary Examiner—Douglas C. Butler
(74) Attorney, Agent, or Firm—Carlson, Gaskey & Olds (57) ABSTRACT

An electronic braking system (WBS) suitable for commercial vehicles which tow trailers, which has on the towing vehicle, braking control of all the axles and a device for setting the braking demand for the trailer which is so adjusted as to equalize the utilization of adhesion between said towing vehicle and trailer. The system includes two adaptive control loops (30a, 30b) which are adjusted sequentially in a co-ordinated manner in order to set respectively the towing vehicle and trailer braking to levels where overall train mean decelerations approximate closely to those corresponding levels demanded by the driver and at the same time set the distribution of braking to seek to achieve equal utilization of adhesion between the tractor and trailer. The system also uses deceleration errors to sequentially adjust the two adaptive control loops.

29 Claims, 5 Drawing Sheets

TRAILER BRAKE CONTROL

The present invention is concerned with trailer brake control systems in motor vehicles, which operate without the use of additional onboard sensors.

The requirement for a full control of a towing vehicle (tractor) and a semi-trailer during braking is such as to generate the need for deceleration control of the tractor in combination with a simultaneous adjustment of trailer braking levels so as to achieve coupling force control in a manner such as to cause each of the tractor and trailer to exert a fair share of the overall braking effort. This situation is equivalent to an equal utilization of adhesion between tractor and trailer and is recognized as being efficient on lining wear and in generating the most stable condition during braking, since skidding will only result from reduced surface adhesion and not from unbalanced braking distribution. Reduced lining wear results from the equitable braking balance in energy absorption which keeps the lining temperatures at their lowest mean level.

EP0303 827 teaches a dual mode trailer control system employing proportional braking as described above for best stability at higher deceleration levels plus, at lower braking demands, a balanced braking regime under which braking is made at levels which depend upon the size and number of axle brakes. However, this approach is not suited to unknown trailer types where numbers and sizes of brakes can vary substantially as different trailers are picked up during road operations.

The requirement of proportional braking distribution between tractor and trailer is the preferred mode in the industry and a number of methods of achieving this have been suggested, in the main requiring measurements of coupling force in two planes for semi-trailers.

Our EP0370 671 discloses a means for controlling the braking distribution and overall combined vehicle deceleration but requires some form of measurement of vehicle deceleration-and of coupling forces in order to achieve these ends simultaneously.

EP0433 362 disclosed a trailer control system in which errors between demand and achieved deceleration automatically cause the trailer braking proportion to be adjusted accordingly. This makes the assumption that any errors in combined vehicle braking must have resulted from variations in trailer braking only. In practice, this is not always the case as the towing vehicle brakes are subject to the same sources of variation in performance as the trailer brakes and correction when made should be directed to that part of the combination which contains the source of braking error levels. Many cases exist where there are variations in both parts of the combination, maybe to different extents, and the present invention attempts to focus suitable corrective adjustment to both said parts of the vehicle in a co-ordinated manner so as to prevent wrongly applied corrections having to be later reversed as the other vehicle half is adjusted. An important feature of the present invention is the requirement for measurement only of deceleration of the combination, saving the significant cost of measuring the coupling forces or of deriving these forces from tenuous processing of vehicle axle load changes and interpreting these from serious levels of noise generated by road Irregularities which are a part of practical vehicle operation.

It is envisaged that trailer braking parameter variations are likely to predominate in sourcing vehicle retardation variations and thereby causing braking errors. However, considering the case of a towing vehicle with better than expected braking performance linked to a trailer with under-performing brakes leads, a simple control system might conclude from the low deceleration errors, that the combination is correctly braked when the distribution is quite clearly in error.

An object of the present application is to provide a system which, although employing only deceleration measurement, has the ability to correct braking in both parts of the vehicle and thereby control both overall deceleration and braking distribution.

The control of semi-trailer braking requires that the system be able to examine the performance of each part of vehicle but this cannot be achieved totally independently. However, it is practical to examine the tractor or trailer performance alone if done with care and then to examine the combined performance in order to assess the braking effectiveness of the other part of the vehicle, so as to be able to apply individual corrections to each part as described above.

Examination of the trailer-only performance can be undertaken preferably after combination braking is established because of the delay in response of the trailer brakes which would make it appear that the vehicle brakes were not responding. Thus all axle braking, once established, would revert to trailer-only braking by slowly removing tractor braking while at the same time increasing trailer braking to compensate for this loss in total braking effort which would otherwise exist. Trailer braking effectiveness is then assessed by relating overall deceleration achieved to the driver demand, allowing for the total combination mass and the boost in trailer braking.

However, since more parameters are known on the tractor and are more constant than trailer characteristics which could change with every new trailer picked up, it is deemed preferable to brake the tractor-only on certain stops and then to assess the trailer performance when braking the combination, The present Application will concentrate on this strategy but recognises that the trailer-only alternative is technically equally possible.

The performance of the tractor-only is most easily assessed -by examining the retardation against demand, for the tractor without a trailer coupled and this will be done whenever the opportunity presents but it is recognised that some vehicles never operate in this mode and for those that do, the braking pressures ate so low, particularly on the rear axle(s) due to the light loading that it does not represent a real test of serious braking.

In accordance with the present invention there is provided an electronic braking system (EBS) suitable for commercial vehicles which tow trailers, which has on the towing vehicle, braking control of all the axles and a means of setting the braking demand for the trailer which is so adjusted as to equalize the braking effect at the road surface between said towing vehicle and trailer, characterized by the employment of two adaptive control loops which are adjusted in turn in a manner to achieve. single direction co-ordination between the loops wherein tractor braking errors are allowed for in the braking of the trailer in order to set respectively the towing vehicle and trailer braking to levels where overall train mean decelerations approximate closely to those corresponding levels demanded by the driver and at the same time set the distribution of braking to seek to achieve equal braking effect at the road surface between the tractor and trailer, further characterized by the use of deceleration errors in said repeated adjustment of the two adaptive control loops.

In a preferred embodiment, the towing vehicle adaptive control loop is adjusted after selected vehicle stops on the basis of the measured error between the drivers braking demand and the deceleration of the tractor/trailer combination when braked by the axles of the towing vehicle alone.

Advantageously during periods of towing vehicle-only braking deceleration is maintained with the normal proportion to the demand, by an increase of towing vehicle braking so as to provide additional braking forces to compensate for the absence of trailer braking, said increase being set in relation to the ratio of mass (Mt) of the rear part of the trailer which is normally braked by the trailer brakes, to the total mass (Mf+Mr) being supported on the towing vehicle axles.

Preferably, the towing vehicle-only braking of the combination takes place only at predetermined but variable intervals and only on selected brake applications where the braking demand is within a preset low band, the vehicle is not subject to any substantial steering input and the speed at the commencement of braking is above a preset threshold yet below an upper limit set by safety considerations.

It is also preferred that the trailer control loop is subject to adaptive adjustment on selected stops other than those of the last paragraph, based upon measurements, made during a selected part of each such stop, of the error signal between deceleration demand and the actual achieved deceleration of the combination.

In a still further preferred arrangement, errors detected during the towing vehicle-only braking phases are not only used to adapt the towing vehicle adaptive loop but are also stored and a percentage of this current figure is used to adjust the braking demand input to the trailer control loop in order to co-ordinate the adaptive adjustment of this latter loop to the adjustment of the towing vehicle loop by compensating for errors in the towing vehicle loop.

The total mass of the tractor/trailer combination can be assessed from the engine output torque and the gear ratio operating between the engine output shaft and the rear wheels as based on the relative speeds of these shafts and the rear wheel radii, during acceleration of the vehicle, this assessment taking place over several suitable acceleration phases with a running average being continuously updated as the vehicle journey continues.

In the event of any ABS operation, it is preferred that any towing vehicle-only braking is immediately inhibited and furthermore any measurement, which is not complete is abandoned whether this relates to the towing vehicle alone or to the whole vehicle from which the trailer performance would be derived and the adjustment of any adaptive constant is prevented.

Preferably, the towing vehicle and trailer have separate adaptive loops which are sequentially adjusted, in which each loop has two parameters (constants) which are representative of braking threshold pressure and the slope of the transfer function characteristic relating deceleration to braking pressures for the appropriate vehicle half.

Upon detection of conditions which indicate the removal and change of the trailer, the adaptive parameters of the trailer system are preferably reset back to pre-programmed starting values while at this event the corresponding towing vehicle parameters are not changed and the learning process continues without a break as running is commenced with the new trailer.

The invention is described further hereinafter, by way of example only, with reference to the accompanying drawings, in which.

As discussed hereinabove, the main strategy selected in the implementation of the present invention is to occasionally brake the whole combination on the tractor brakes alone and for this operation these brakes are boosted in order to generate additional braking forces to retard the trailer at the demanded deceleration level. This is referred to hereinafter as the (trailer) mass corrected setting for the tractor only. Such stops are only occasional and only allowed to take place under selected conditions in order that safety during the braking operation will not be prejudiced. Normal braking makes use of all brakes on the whole tractor/trailer combination and it is on these stops that the braking performance of the trailer is examined and it is an important feature of this scheme that the adaptive correction to trailer braking levels is made with reference to the errors recorded in earlier tractor-only braking operations. This means that if the tractor-only braking operation has shown a deceleration error, then a large part of this error level is injected into the trailer measurement in order to equalize the error in both systems as a means of giving priority to braking balance between tractor and trailer and then correcting deceleration gradually over a series of subsequent stops.

From a braking aspect, a typical tractor/trailer combination in shown in FIG. 1 and can be separated into three mass sections as follows:

Mf supported & braked by the tractor front axle.

Mr supported & braked by the rear tractor axle/bogie.

Mt supported & braked by the trailer rear bogie

The mass section Mr, while including the tractor rear elements is made up mainly of the trailer front section and the load carried thereon. It is this element which exerts a downforce Fv which is significant in the laden case, and which during braking must be retarded by countering the thrust Fh. The measurement of this downforce is made by sensing the load on the rear axle(s) of the tractor and subtracting the axle tare weight of the tractor rear section which remains sensibly constant and being known from the build stage is pre-set into the system, The front mass is similarly constant and again is pre-set into the system as a post-build parameter.

In some tractors, particularly those with a single rear axle, the point of application of force Fv is in front of the rear axle and thus a component is applied to the front axle acting effectively as an increase in mass Mf. The fraction of this Fv force which acts in this way is determined by dimensions and is set into the system by post-build programming, ie KFv acts on the rear axle and is sensed and (1−K) Fv appears on the front axle and can be inferred from the increase in rear axle load. The trailer mass Mt is unknown because it depends on the placing of the trailer load and is unmeasured on a standard trailer. However, it can be derived from the total mass of the combination which is assessed during acceleration since it is impractical to attempt to measure it during braking when the trailer braking contribution is unknown. During acceleration, the engine management system supplies output torque or power signals and these are coupled to the operating gear ratio measured from engine and wheel speeds taking into account the rolling radius of the drive wheels.

When braking the whole vehicle on tractor brakes only, these are boosted in order to restore pedal response in the absence of trailer contribution. This boost or trailer mass compensation is calculate on the basis of mass elements as follows:

Front axle pressure Pf is normally set as:

$$Pf = Pfb + Pc^+d[(1-K)Fv + Wf]$$

Rear axle pressure $Pr$ is similarly: –

$$Pr = Prb + Pc^+d[Kfv + Wr]$$

where: – $Pfb$ & $Prb$ are $P$ thresholds.

$d$ = demand $deceln$.

$Wf$ = Front tare load.

$Wr$ = Rear tare load.

$Pc$ = pressure const. in bar/tonne/$g$ $Kv$ = coupling geometry factor.

Figure 1:
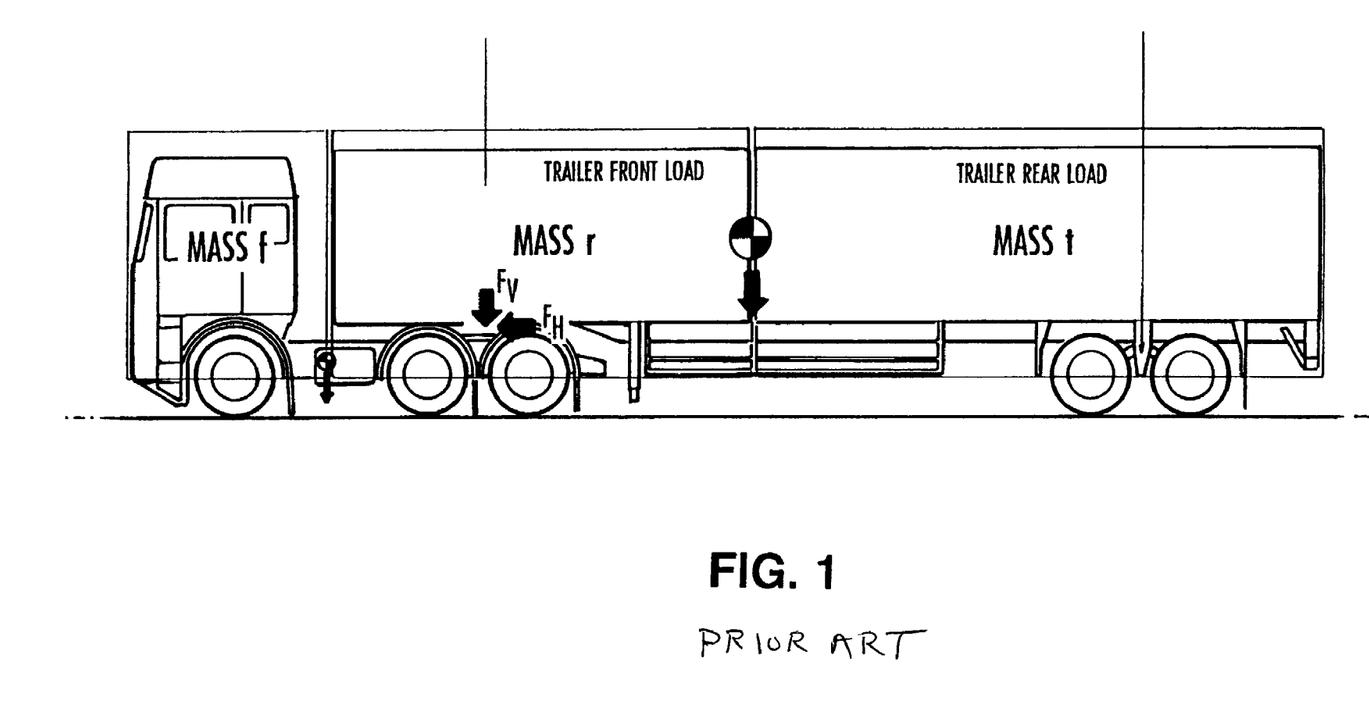
FIG. 1 shows the sectionalized masses of a typical semi-trailer combination vehicle which has been considered in the system organization.

These levels are increased to:

$$Pf'=Pfb+Pc*d[(1-K)Fv+Wf](1+Rm)$$

where:

$$Pr'=Prb+Pc*d[KFv+Wr](1+Rm)$$

$$1+Rm = \frac{\text{Total mass}}{Mf + Mr} \quad \text{see FIG. 1}$$

The front and rear threshold pressure Pfb & Prb are preset in ratio from a knowledge of the braking equipment fitted to the tractor and are adapted together as a single quantity as will be explained later.

Because tractor-only braking can be dangerous in some circumstances, it would never be applied in vehicles which were not fitted with ABS or even used on vehicles in which the ABS was not functioning correctly. In addition, tractor-only braking takes place only on selected brake applications at predetermined application intervals which are set at an approximate frequency but this is increased where significant error in tractor braking performance is exposed. This frequency is again reduced once the adaptive process has reduced the error to a low level.

The final decision, upon a brake application being commanded, even though a tractor-only application is scheduled, is set to depend upon the following safety override conditions:

a) The mass compensated demand represents a deceleration demand which is lower than a predetermined limit typically lying in the range 0.2–0.3 g yet greater than a lower limit of 0.15 g or thereabouts, below which measurement is unreliable.

b) There is no significant steering input as detected from the steering wheel angle or differential wheel speeds.

c) The vehicle speed at the commencement of braking lies in a preset band typically 30–70 km/h.

When a brake application is selected, the mass compensation increase is applied and the tractor-braking mode is entered if the conditions above are all met. If not, a normal application is taken and the tractor-only mode deferred until the next application. When the tractor-only mode is entered, the brakes are applied only for a preset time period limited to typically 2 sec after the demand has . stabilized. After this point in time, the mass compensation is gradually reduced and the trailer brake demand is gradually increased so that full balanced braking continues for the rest of the stop. However, the only assessment which is made on this stop is that of tractor-only braking in which the deceleration error is examined in the 2 sec period.

If the demand changes significantly during this period or there is any detection of skidding, the period is ended immediately and full vehicle braking takes over and the tractor-only phase will be repeated on the next suitable stop.

During this 2 sec assessment period, errors between the braking demand and the level of achieved deceleration are accumulated once the demand has stabilized. The mean error figure is stored and used to update the adaptive constants which relate to the tractor axle braking pressures to the demand input. These 'constants' are used for each section of the vehicle and are specifically a pressure threshold correction and a pressure constant modifier which starts out at a nominal figure and is increased for poor braking or reduced for better than expected braking.

Figure 2:
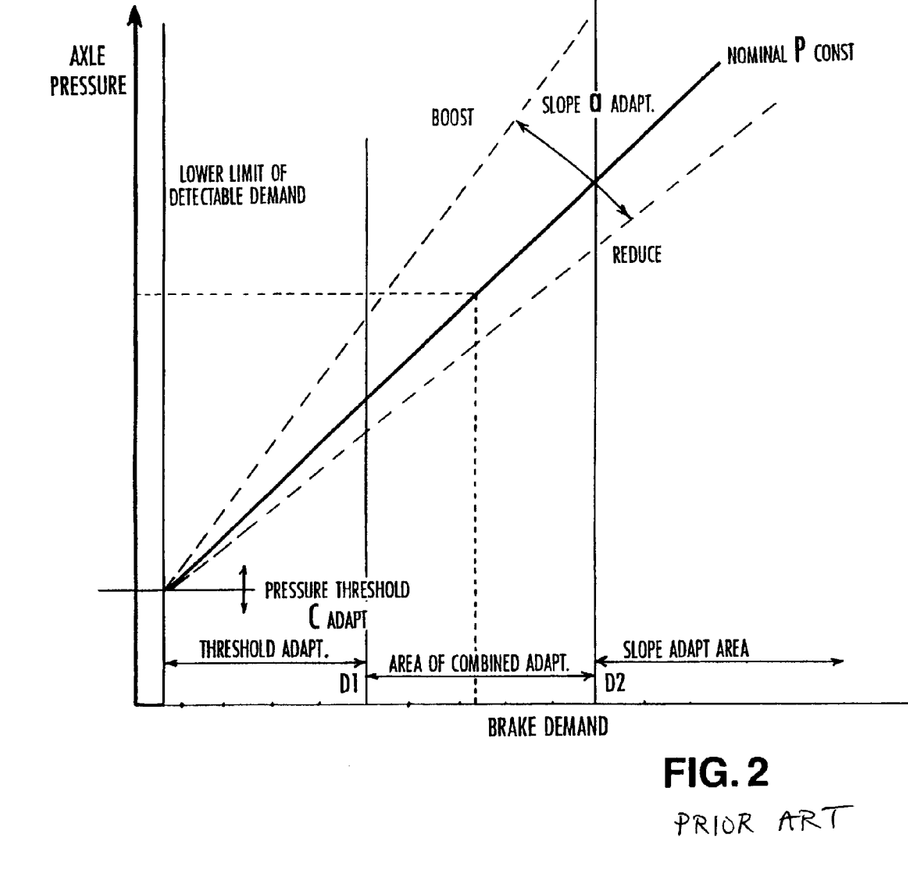
FIG. 2 shows a typical relationship between demand and axle pressure for a typical set of brakes which is needed to achieve that deceleration level.

The effect of this adjustment mechanism on the adaptive loop is shown in FIG. 2 which is a plot of axle pressure against deceleration demand. The pressure characteristic shows that for both tractor and trailer, pressure must be subject to an initial step as soon as the minimum demand is exceeded and thereafter increases linearly with demand. FIG. 2 shows that at low demands/pressures the errors detected are used to provide data which adjusts the threshold point, while at higher demands, errors give data which adjusts the slope of the pressure/demand transfer function: where:

$$P = a*d + C.$$

a=Pressure Const.
C=threshold step

Thus the threshold step and Pressure constant terms will be adapted from error signals and the system is programmed to accent corrections at a preset fraction of the correction levels generated on any particular stop. In this way corrections cause the characteristic to be gradually adapted and if the chosen fraction is made proportional to the correction amplitude the adaptive or learning process becomes exponential and over-correction followed by re-correction will be reduced.

Co-ordination of the adaptive adjustment of the towing vehicle and trailer braking systems is a preferred feature of the present invention in order that the two loops can be sequentially adapted without any excessive interaction thereby achieving the quickest and most stable settling regimes. This co-ordination is not the mutual co-ordination of EP B 0370 671but a single direction co-ordination wherein the tractor system errors are allowed for in the trailer system.

Taking the case where the tractor is overbraked, tractor-only braking will expose an excess deceleration which, given a perfect trailer, would lead to some over braking of the tractor/trailer combination and consequent reduction of trailer braking levels. "Co-ordination" in terms of this present invention is the means whereby the excess deceleration of the tractor braking alone is stored and a percentage of this figure produces an adjustment to the effective braking demand used in the error assessment of the trailer system The actual percentage used depends on the mass ratio Rm.

Rm is given by: Mt/(Mf+Mr).

$1/(1+Rm)=(Mf+Mr)$/whole mass.

This excess deceleration is multiplied by this factor $1/(1+Rm)$ and generates the reduced excess deceleration expected from a perfect trailer when braked along with this tractor. This is the component which is added to the demand for comparison with the achieved combination deceleration to determine the trailer error. As the tractor is adapted back to the correct braking level, this trailer offset is correspondingly reduced to arrive at an undistorted error signal and deceleration errors are gradually reduced to zero for both vehicle halves.

Figure 5:
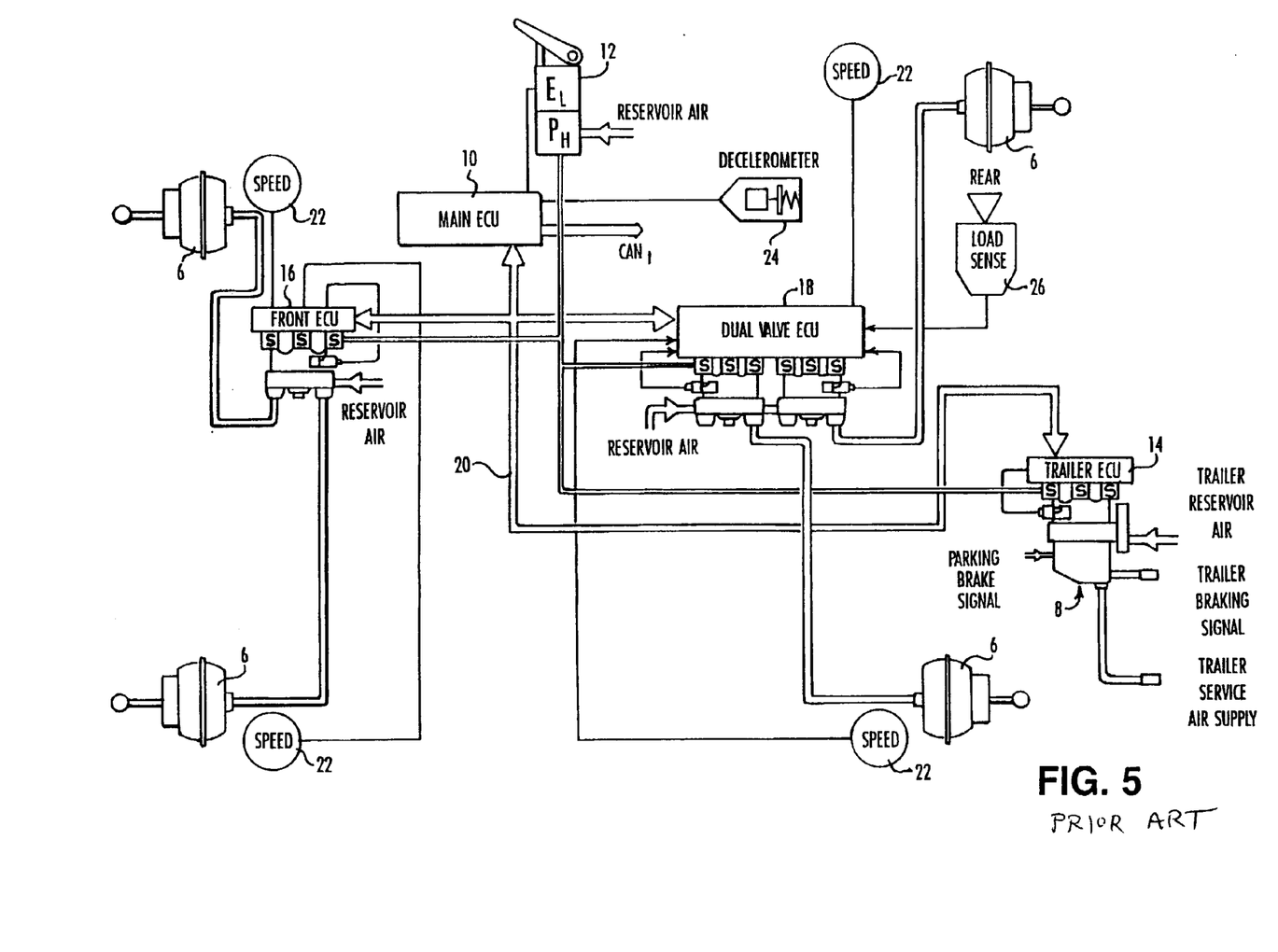
FIG. 5 shows a typical commercial vehicle electronic braking system which would incorporate the dual adaptive loops in the main ECU.

Referring now to FIG. 5 there is illustrated by way of example the Electronic Braking System organization on a tractor unit capable of towing a standard trailer and adjusting the trailer braking pressures by means of an electronically controlled trailer valve 8 on the towing vehicle or communicating to an EBS trailer via a special data link CANt. The EBS on the tractor unit includes brake actuators 6. In this particular system, used as an example, a 3-channel EBS is employed to give axle control on the tractor steering axle and wheel control on the drive axle, primarily to improve the split mu ABS performance.

Braking demands are transmitted to the main ECU 10 from a transducer 12 incorporated in the pedal valve assembly. The adaptive section of the present system is built in software terms within the computer core of the main ECU 10 which communicates with smaller ECUs 14,16,18 associated with each of the pressure control valves via a high speed data exchange system 20. The smaller ECUs have the task of handling the peripheral signals and performing the local control of pressure for the brakes, from demand signal issued from the main ECU.

Wheel speed signals from wheel speed sensors 22 are converted within these ECUs and transmitted back to the main ECU 10 for monitoring and higher level purposes. The main ECU 10 also receives the vehicle deceleration signal from an on-board decelerometer 24 which, in certain lower cost applications would be replaced by a differentiated vehicle reference speed signal. Unfortunately, the result of this replacement incurs the loss of automatic gradient correction which would result in error in some measurements made on hills. However, this is not sufficient to invalidate the control principles since in a gradually adapting system, gradient errors would tend to cancel over any period of normal road operation at the expense only of increased settling time. The rear axle load is sensed by a load sensor 26 and passed to the main ECU 10 where it is used to generate braking proportional to load being carried and to give a measure of the variable component of mass Mr. Mf is largely obtained from stored build data but in some vehicles incorporates also a component of the trailer load as determined from the coupling position in relation to the rear axle.

Trailer braking is controlled from the main ECU 10 and can utilize either electronic or pneumatoic signaling or both. However, to cater to perfectly standard trailers known today, an electronically controlled trailer valve 8 as shown in FIG. 5 is needed. Given either means of signaling, the level of trailer braking is set from the main ECU 10 which takes into account the driver demand from the pedal transducer 12 as a master control signal but modifies this by taking into account the current state of the adaptive "constants", one of which may be subject to some adjustment after completion of the brake application.

Figure 3A:
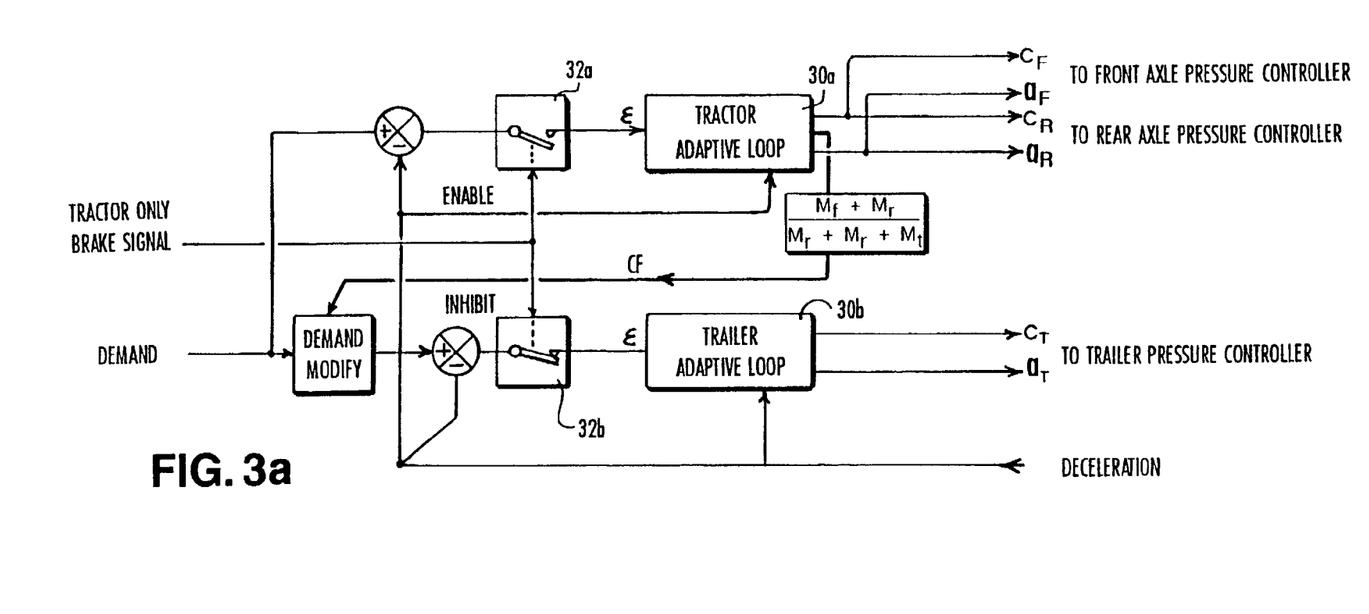
FIG. 3a outlines the dual adaptive loops with the co-ordinating feedforward therebetween in a system in accordance with this invention.
Figure 3B:
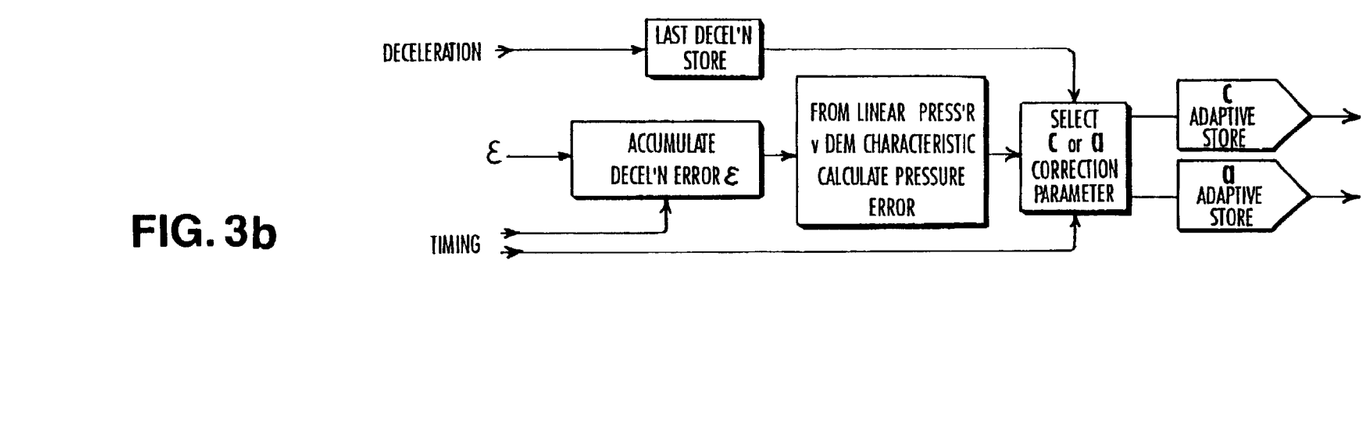
FIG. 3b illustrates the components of each adaptive loop able to adjust to the pressure threshold of the axle brakes and adapt the slope of the pressure characteristic.

The adaptive system is shown in FIGS. 3a and 3b for a dual parameter adaptive correction organization. The separate loops 30a and 30b of FIG. 3a are for tractor and trailer and both have deceleration error as the input signal. However, assessment is made individually and sequentially depending upon the state of the tractor-only braking signal input. For normal stops enable and inhibit switches 32a,32b are in the position shown in FIG. 3a so that the trailer adapt loop 30b will be affected by the deceleration error occurring in the selected part of the stop. Occasionally circumstances require the selection of a tractor-only stop in which the early part of the stop is made by braking the tractor alone and during this period the input signal is activated to disable the trailer loop 30b and enable the tractor loop 30a while at the same time boosting the braking demand level as described hereinafter in the trailer mass compensation feature. During a short time period once the demand has stabilized the tractor adaptive loop 30a assesses and stores the average error between demand and achieved deceleration levels. This stored error is used to modify the appropriate tractor loop 'constant' after the end of the stop.

It should be noted that after the assessment period of typically 2 sec. this loop 30a is disabled and the trailer mass compensation is reduced to zero at a controlled rate while the trailer braking is built up at a similar controlled rate, although slightly in advance of the boost removal, so as to compensate for delays in the trailer system.

As shown in FIG. 3a, the tractor loop corrective output signals for threshold C and slope a, are routed to the front and rear axle pressure control loops. The co-ordinating output formed from the stored error figure amended by the factor:

Mf+Mr)/(Mf+Mr+Mt), is provided as a third input to the deceleration error calculation for the trailer adaptive loop 32b. This provides the mechanism whereby the trailer loop 30b receives a compensating adjustment if a tractor braking error exists. In the event of a tractor-only braking phase, the tractor loop 30a is the only one to receive any subsequent adjustment even though the full braking duration may be much longer than the 2 sec assessment period for the tractor loop. This is because it is expected that the combined vehicle may be in some deceleration error after the transition back to normal braking.

The action of the adaptive loops 30a, 30b is different in the event of a change of trailers. Operation of the tractor without a trailer is recognized by detection of very light rear axle loading (down to a figure near to the maximum tare weight). Such a condition is typical of static conditions during a trailer change and the signal is used to reset the trailer adaptive adjustments to the nominal level programmed into the system as post-build parameters while the tractor adaptive 'constants' are allowed to remain at the current stored level so as to leave this learning process uninterrupted.

The internal organization of the adaptive loops 30a, 30b is expanded in FIG. 3b and shows the receipt of deceleration error as the main input signal but includes subsidiary timing and mean deceleration level signals. Error adjustment is made by adapting one of two variables C or a, as shown in FIG. 2, based on the mean braking demand registered over the assessment period. At low level demands, the threshold level C is adjusted while at higher levels of demand the slope of the characteristic a, is adjusted. At all times, the current levels of these two 'constants' are used to set the pressure demands to tractor and trailer brakes in association with driver demand and, where appropriate axle load. The error level on any stop is accumulated and averaged as set by the timing signals which select a period after the settlement of the demand, which is short for the tractor-only braking phase and can be longer for normal full vehicle stops provided that there are no serious changes to demand or no ABS operation is produced. The error average is processed after the brakes are released, to assess the pressure correction needed to reduce the error, as based on the threshold C and slope a values being used in the transfer function characteristic shown in FIG. 2. The amplitude of the pressure correction calculated which will be used to adjust the appropriate parameter C or a, is a variable and preset into the system to adjust the adaptive response so as to generate a learning process which achieves a stable adjustment over several stops.

Figure 4:
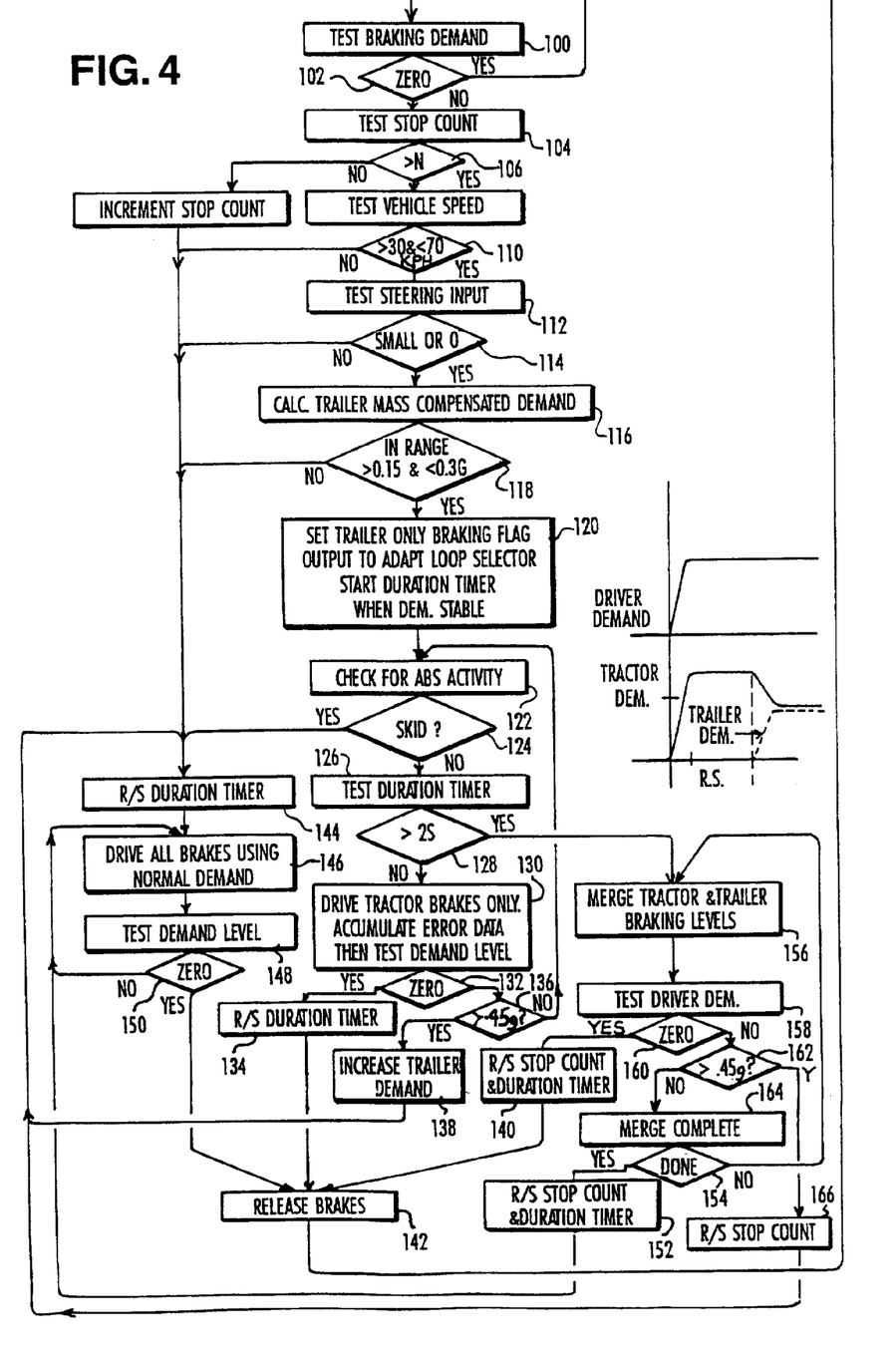
FIG. 4 shows a flow-chart for generating the tractor-only braking decision.

FIG. 4 is a simplified flow chart which explains the selection process, within the main ECU of the tractor-only braking phase, making tests necessary for initiation of the phase and then timing the short assessment period. After this period, the tractor and trailer braking levels are merged in that both systems receive gradually adjusted demands over a following period of typically 1 sec, so as to achieve a normal distribution of the combined vehicle braking designed to be transparent to the driver. Thus the tractor reduces braking and the trailer builds up braking from zero as shown in the inset waveform diagram of FIG. 4

The flow-chart shows a section of program which is active only when a driver demand for braking is detected at which point the stop count is tested against the value N which marks the point of the tractor-only braking phase. A count of N or greater means that a tractor-only braking phase is due but it should be noted that N is not constant but has a component which is inversely proportional to the level of tractor error which was stored on the last stop. In this way the frequency of tractor-only stops is reduced as the braking error falls. Where the schedule is such as to call for a tractor-only stop, the vehicle speed is checked to see if it lies in the 30–70 km/h band where braking of one half of the total vehicle is both useful and safe. If this is the case, a test of the steering input is made and if zero or near zero, tractor-only braking is sanctioned or else normal combination braking is substituted. If tractor-only braking is given the go-ahead, the trailer mass compensated demand is calculated and tested to lie typically in the range 0.15–0.3 g in which conditions for assessment are deemed suitable, then the tractor-only braking flag is set, the tractor adaptive loop is selected and the duration timer is started once the demand becomes stable. This timer is incremented in a timing/clocking sub-routine external to the program shown but well known in real time systems. The skid detection subroutine is accessed and a test is made on all wheel speeds to check for incipient skidding conditions and, if found at any wheel, the tractor-only braking is abandoned in favour of the complete vehicle. If no skidding is detected, the tractor-only brakes are Driven with the increased demand which continues for the 2 sec period of the duration timer or until the demand falls to zero. An additional test is made during this period and during the following merge period to detect a sudden increase in driver braking demand. If a demand in excess of 0.45 g is found, then tractor-only braking or the following merge process is immediately switched to braking of the full vehicle in order to respond to what might be an emergency. Duration and stop counters are reset where appropriate.

Thus tractor-only braking continues and error data is collected, normally for 2 sec, after which the program switches to merge the tractor and trailer braking levels over many cycles through these programmed steps, gradually increasing trailer braking and, with a short lag, reducing tractor braking until the full vehicle braking levels are attained. This takes over approximately 1 sec after which the Stop Counter is reset and the Duration Counter is cleared. If the tractor-only braking period is curtailed the stop counter is not reset, thereby setting up conditions for a next stop retry of this operation for tractor assessment. Demand falling to zero is tested at each pass through the program so as to generate a brakes release without delay.

The various steps in the flow-chart of FIG. 4 are summarized hereinafter:

100 - Test braking demand
102 - Zero?
104 - Test stop count
106 ->N?
108 - Test vehicle speed
110 ->30&<70?
110 - Increment stop count
112 - Test steering input
114 - Small or 0?
116 - Calculate trailer mass compensated demand
118 - In range>0.15+<0.3 g ?
120 - Set tractor-only braking flag output to ADAPT LOOP SELECTOR start duration timer when demand stable
122 - Check for ABS activity
124 - Skid?
126 - Test duration timer
128 - ->2s?
130 - Drive tractor brakes only. Accumulate error data then test demand level.
132 - Zero?
134 - Reset duration timer
136 - >0.45 g?
138 - Increase trailer demand
140 - Reset stop count and duration timer
142 - Release brakes
144 - Reset duration timer
146 - Drive all brakes using normal demand
148 - Test demand level
150 - Zero?
152 - Reset stop count and duration timer
154 - Done?
156 - Merge tractor and trailer braking levels
158 - Test driver demand
160 - Zero?
162 - >0.45 g?
164 - Merge complete
166 - Reset stop count The system described, measures the braking performance of each half of the vehicle in a sequence which is made sufficiently flexible to preserve safety when only one part is braked, yet designed to allow the adaptive process, particularly on linking up a different trailer, to take place quickly and effectively.

The change of a semi-trailer is detected by the fall in load sensed at the tractor rear axle to a tractor-only level which is stored in the system memory as an initial static setting plus a margin for tolerance and additional equipment which might be installed. Alternatively, detection of a selected electrical circuit on the trailer is used to give an indication of trailer uncoupling if the load measurement could be ambiguous with other types of trailer.

In order to simplify the text, the aforegoing description has been written to describe tractor and semi-trailer installation. However, the principle is extendable to full drawbar and centre-axle trailers with only an alternative means of uncoupled trailer detection being provided. However, the division of mass Mf, Mr and Mt are slightly altered in the latter case.

In a full trailer, the mass Mr is restricted to that part of the towing vehicle load which is supported by the rear axles(s) and should cause proportional braking on the towing vehicle, while the trailer mass Mt comprises all that which is supported on the trailer front and rear axles, with the distribution of braking between these axles being a function of the trailer.

In a centre axle trailer, a small part of the mass of the trailer, up to 1 ton, may act on the towing vehicle and must be sensed there, even though it is impossible to distinguish this component from the towing vehicle load. However the total mass of the combination minus the towing vehicle mass will still give the trailer mass which should be braked by the trailer axles.

What is claimed is:

1. An electronic braking system for a motor vehicle having a tractor towing a trailer, comprising:
   a brake input corresponding to a requested deceleration;
   a load sensor measuring a generally vertical load on said tractor from a portion of said trailer;
   a deceleration device determining an actual deceleration of said motor vehicle;
   a processor having an adaptive routine comparing said actual deceleration to said requested deceleration and calculating first and second adaptive control loops for setting tractor and trailer braking levels, respectively, said tractor and trailer braking levels being partially determined by said mass of said portion of said trailer; and
   first and second errors generated by differences between said actual and said requested decelerations with said first and said second errors adjusting said first and second adaptive control loops, respectively.

2. The system according to claim 1, wherein said load sensor measures said mass of a front portion of said trailer at a rear tractor axle.

3. The system according to claim 1, wherein said processor calculates a total mass of said motor vehicle using an engine torque and a gear ratio during an acceleration in combination with said generally vertical load.

4. The system according to claim 1, wherein said deceleration device detects the change in speed of said motor vehicle over a period of time.

5. The system according to claim 1, wherein said deceleration device is an accelerometer.

6. The system according to claim 1, wherein said processor includes at least one controller.

7. The system according to claim 1, wherein said processor includes software.

8. The system according to claim 1, wherein said first adaptive control loop include initial values for front and rear tractor brake pressures increased by an amount relating to a total mass of said motor vehicle.

9. The system according to claim 8, wherein said first error includes said differences between said actual and said requested decelerations during tractor braking only.

10. The system according to claim 1, wherein said adaptive routine is executed during only during desirable vehicle operating parameters.

11. The system according to claim 10, wherein said desirable vehicle operation parameter includes said requested deceleration being in a range of approximately 0.15–0.30 g.

12. The system according to claim 10, wherein said desirable vehicle operation parameter includes an insignificant amount of steering input.

13. The system according to claim 10, wherein said desirable vehicle operation parameter includes a vehicle speed in a range of approximately 30–70 km/h.

14. The system according to claim 10, wherein said desirable vehicle operation parameter includes a non-ABS braking condition.

15. The system according to claim 1, wherein a percentage of said first error is utilized to adjust said second adaptive control loop and determine said second error.

16. The system according to claim 1, wherein each of said errors includes a brake pressure threshold component and a brake sure constant component.

17. The system according to claim 1, wherein said first and second adaptive control loops are adjusted until said first and second errors converge to zero.

18. The system according to claim 1, wherein parameters of said first adaptive control loop are maintained and parameters of said second adaptive control loop are reset in the event of a trailer change.

19. A method of distributing a braking force between a tractor and a trailer of a motor vehicle, comprising the steps of:
   a) requesting a deceleration;
   b) calculating a first adaptive control loop corresponding to a tractor braking level;
   c) braking the motor vehicle with the tractor only;
   d) comparing the requested deceleration to an actual deceleration;
   e) generating a first error corresponding to a tractor braking error defined by differences between the requested and actual decelerations; and
   f) calculating a second adaptive control loop factoring said tractor braking error corresponding to a trailer braking level.

20. The method according to claim 19, wherein step b) includes calculating a total mass of the motor vehicle using engine torque and a gear ratio during an acceleration.

21. The method according to claim 20, wherein step b) includes measuring a generally vertical load on the tractor from a portion of the trailer.

22. The method according to claim 21, wherein step b) includes measuring a front portion of the trailer at a rear tractor axle.

23. The method according to claim 19, wherein step d) includes measuring a motor vehicle deceleration with an accelerometer.

24. The method according to claim 19, wherein step d) includes calculating a change in speed of the motor vehicle over a period of time.

25. The method according to claim 19, wherein the first adaptive control loop includes trailer brake pressure threshold and pressure constant components.

26. The method according to claim 19, wherein second adaptive control loop includes tractor brake pressure threshold and pressure constant components.

27. The method according to claim 19, wherein step f) includes modifying the second adaptive control loop by an amount corresponding to a percentage of a mass ratio of the motor vehicle.

28. The method according to claim 19, further including step g reducing the tractor braking level and increasing the trailer braking level while the first and second adaptive control loops are adjusted and the first and second errors converge to zero.

29. The method according to claim 19, wherein step c) occurs only during desirable vehicle operating conditions.

* * * * *